(12) United States Patent
Buckland et al.

(10) Patent No.: US 6,715,011 B1
(45) Date of Patent: Mar. 30, 2004

(54) PCI/PCI-X BUS BRIDGE WITH PERFORMANCE MONITOR

(75) Inventors: Pat Allen Buckland, Austin, TX (US); Daniel Marvin Neal, Round Rock, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 09/583,712

(22) Filed: May 31, 2000

(51) Int. Cl.[7] .............................................. G06F 13/00

(52) U.S. Cl. ...................................................... 710/100

(58) Field of Search ................................ 710/100, 119, 710/311, 306, 310, 322, 312, 305, 309

(56) References Cited

U.S. PATENT DOCUMENTS

| | | | |
|---|---|---|---|
| 5,778,194 A | | 7/1998 | McCombs |
| 5,913,043 A | * | 6/1999 | Carter et al. ................. 710/100 |
| 5,961,625 A | * | 10/1999 | Carter ......................... 710/311 |
| 5,970,439 A | | 10/1999 | Levine et al. |
| 5,996,034 A | * | 11/1999 | Carter .......................... 710/10 |
| 6,098,169 A | * | 8/2000 | Ranganathan ............... 712/227 |
| 6,154,801 A | * | 11/2000 | Lowe et al. ................. 710/119 |
| 6,175,889 B1 | * | 1/2001 | Olarig ......................... 370/402 |
| 6,256,775 B1 | * | 7/2001 | Flynn .......................... 717/127 |
| 6,470,478 B1 | * | 10/2002 | Bargh et al. ..................... 716/4 |

FOREIGN PATENT DOCUMENTS

| | | |
|---|---|---|
| JP | 07-225737 | 8/1995 |
| JP | 10-63615 | 3/1998 |
| JP | 10-275099 | 10/1998 |
| WO | WO PCT 97/38369 | 10/1997 |

* cited by examiner

*Primary Examiner*—Paul R. Myers
*Assistant Examiner*—Kim T. Huynh
(74) *Attorney, Agent, or Firm*—Joseph P. Lally; Mark E. McBurney

(57) ABSTRACT

A bus bridge for use in a data processing system is disclosed in which the bridge includes a primary bus interface coupled to a primary bus, a secondary bus interface coupled to a secondary bus, a performance monitor register; and a state machine connected to the primary and secondary bus interfaces and configured to record the occurrence of a specified event in the performance monitor register. In a host bridge embodiment of the bridge, the primary bus is a host bus of the data processing system and the secondary bus is a PCI bus or PCI-X bus. The bridge may monitor events such as accepting a posted memory write (PMW), accepting with split response a read request (RR), retrying a PMW, retrying a RR, disconnecting a PMW when the bridge is a target of the operation, and accepting a PMW, accepting a split read completion operation (SRC), accepting a RR with split response, accepting a split write request operation (SWR) with split response, retrying a PMW, retrying a RR, retrying a SWR, retrying a SRC, and disconnecting a SRC when the bridge is a master. In a PCI-X to PCI-X embodiment of the bridge, the bridge may monitor the primary, and secondary busses are PCI-X or PCI busses and the events monitored including accepting a PMW, accepting a SRC, accepting a RR with spilt response, accepting a SWR with split response, retrying a PMW, retrying a RR, retrying a SWR, retrying a SRC, disconnecting a PMW, and disconnecting a SRC when the bridge is a target and accepting a PMW, accepting a SRC, accepting a RR with split response, accepting a SWR with split response, accepting a RR with immediate response, accepting a SWR with immediate response, retrying a PMW, retrying a RR, retrying a SWR, retrying a SRC, disconnecting a PMW, and disconnecting a SRC when the bridge is a master. In either embodiment, the bridge may further include a mode register corresponding to each performance monitor register where the value of the mode register determines the specified activity monitored by the corresponding performance monitor register.

20 Claims, 6 Drawing Sheets

PHB TARGET OPERATIONS

| 300 | Operation Accepted | Operation Accepted with Split Response | Operation Accepted with Immediate Response | Operation Retried | Operation Disconnected |
|---|---|---|---|---|---|
| Posted Memory Write (DMA Write) | YES | N/A | N/A | YES | YES |
| Read Request (DMA Read Request to System Memory) | N/A | YES | | YES | |
| Split Write Request | N/A | N/A | N/A | N/A | N/A |
| Split Read Completion | | N/A | N/A | | |
| Split Write Completion | | N/A | N/A | | N/A |

FIG 3

PHB MASTER OPERATIONS

| | Operation Accepted | Operation Accepted with Split Response | Operation Accepted with Immediate Response | Operation Retried | Operation Disconnected |
|---|---|---|---|---|---|
| Posted Memory Write (Store op to memory space) | YES | N/A | N/A | YES | |
| Read Request (Load Operation) | N/A | YES | | YES | |
| Split Write Request (Store op to I/O Space) | N/A | YES | | YES | |
| Split Read Completion (DMA read data from system memory given to requestor) | YES | N/A | N/A | YES | YES |
| Split Write Completion | N/A | N/A | N/A | N/A | N/A |

PCI-X TO PCI-X TARGET OPERATIONS

500

| | Operation Accepted | Operation Accepted with Split Response | Operation Accepted with Immediate Response | Operation Retried | Operation Disconnected |
|---|---|---|---|---|---|
| Posted Memory Write (PMW) (DMA Write to System Memory or Store op to memory space if on the bus connected to the PHB) | YES | N/A | N/A | YES | YES |
| Read Request (DMA Read Request to System Memory or Load Op if on the bus connected to the PHB) | N/A | YES | YES | YES | N/A |
| Split Write Request (SWR) (Store op to IO space if on the bus connected to the PHB) | N/A | YES | N/A | YES | N/A |
| Split Read Completion (SRC) (Response to a DMA Read Operation to System Memory or response from an IOA to a Load Op) | YES | N/A | N/A | YES | YES |
| Split Write Completion (SWC) (Response to a Store to I/O space) | | N/A | N/A | N/A | N/A |

FIG 5

PCI-X TO PCI-X MASTER OPERATIONS

| 600 | Operation Accepted | Operation Accepted with Split Response | Operation Accepted with Immediate Response | Operation Retried | Operation Disconnected |
|---|---|---|---|---|---|
| Posted Memory Write (PMW) (DMA Write to System Memory or Store op to memory space) | YES | N/A | N/A | YES | YES |
| Read Request (DMA Read Request to System Memory or Load Op to IOA) | N/A | YES | YES | YES | |
| Split Write Request (SWR) (Store op to IOA's I/O space) | N/A | YES | YES | YES | |
| Split Read Completion (SRC) (Load data to PHB or DMA Read Data from System Memory returned from previous RR) | YES | N/A | N/A | YES | YES |
| Split Write Completion (SWC) (Response to PHB to a previous store to an IOA's I/O space) | | N/A | N/A | | N/A |

PCI/PCI-X BUS BRIDGE WITH PERFORMANCE MONITOR

BACKGROUND

1. Field of the Present Invention

The present invention generally relates to the field of input/output (I/O) busses and more particularly to a system for monitoring the performance of PCI-X and PCI bridges.

2. History of Related Art

In the field of microprocessor based data processing systems, the use of industry standard busses to improve the performance and expand the capabilities of the data processing systems is well known. Standardized I/O busses provide a mechanism for connecting a wide variety of peripheral devices to the host bus of a data processing system. Peripheral devices may include, for example, high speed network adapters, hard-disk controllers, graphics adapters, audio adapters, and a variety of other devices. Among the most prevalent of the industry standard I/O busses is the Peripheral Component Interface (PCI) bus. The PCI bus has evolved over the years from revision 2.0 introduced in 1992 operating at a bus frequency of 33 MHz, to revision 2.1 introduced in 1995 with a maximum bus frequency of 66 MHz, to revision 2.2 introduced in 1998 and incorporating features such as message interrupts. Complete documentation of the PCI Local Bus Specification Rev. 2.2 (PCI Spec 2.2) is available from the PCI special interest group, 2575 N.E. Kathryn #17, Hillsboro, Oreg. 97124 (website www.pcisig.com). Under PCI Spec 2.2, PCI bridges support two types of transactions: posted transactions (including memory write cycles), which complete on the initiating bus before they complete on the target bus, and delayed transactions (including memory read requests and I/O and configuration read/write requests), which complete on the target bus before they complete on the initiating bus. A PCI device that initiates a delayed transaction must relinquish control of the local PCI bus and wait for the target device to return the requested data (in the case of a delayed read request) or a completion message (in the case of a delayed write request). Once the requested information has arrived, the requesting device must wait until it again receives control of the PCI bus in the normal course of operations before it can retrieve the information from the PCI bridge.

More recently, the PCI-X Addendum to Local Bus Specification Rev. 2.2 has been proposed as a means for further improving the performance of PCI busses. The PCI-X Addendum incorporates registered transactions that improve performance by permitting a PCI-X compatible bridge or I/O adapter to make decisions on every other clock cycle. In addition, PCI-X incorporates protocol enhancements such as the attribute phase and split transactions that allow more efficient use of the bus. PCI-X is fully backward compatible with conventional PCI systems such that conventional PCI adapters will work in PCI-X capable systems and PCI-X adapters will work in PCI systems. If a conventional PCI device is located on a PCI-X bus, however, all adapters on the bus must operate in conventional PCI mode regardless of whether they are PCI-X capable. For complete PCI-X documentation, the reader is referred to the PCI-X Addendum 1.0 Final Release available from the PCI Special Interest Group.

The architectures of state-of-the-art microprocessors now typically incorporate mechanisms for some level of performance monitoring capability. Performance monitors in highly complex microprocessors are needed to measure the efficiency of a particular design and provide valuable information that enables a designer to modify a current system and improve future systems. In a microprocessor application, a performance monitor might, for example, monitor various aspects of the cache system such as the read miss rate. As processor performance has improved, the I/O subsystem, including I/O bridges such as host-to-PCI and host-to-PCI-X bridges as well as PCI-to-PCI and PCI-X-to PCI-X bridges, have become the bottlenecks for system throughput. Efforts to combat this I/O bottleneck problem has resulted in ever increasingly complex I/O bridge designs. Despite the increasing complexity of I/O bridge designs, however, there is currently lacking a mechanism or architecture within the bridges themselves that would enable embedded and flexible I/O subsystem performance monitoring. Accordingly, it would be highly desirable to implement an I/O bus bridge with performance monitoring capabilities. It would be further desirable if the implemented design was flexible, did not consume a significant percentage (area) of the I/O bridge design, and did not significantly degrade the performance of the bridge.

SUMMARY OF THE INVENTION

The problems identified above are addressed by a bus bridge of a data processing system in which the bridge includes a primary bus interface coupled to a primary bus, a secondary bus interface coupled to a secondary bus, a performance monitor register; and a state machine connected to the primary and secondary bus interfaces and configured to record the occurrence of a specified event in the performance monitor register. In a host bridge embodiment of the bridge, the primary bus is a host bus of the data processing system and the secondary bus is a PCI bus or PCI-X bus. The bridge may monitor events such as accepting a posted memory write (PMW), accepting with split response a read request (RR), retrying a PMW, retrying a RR, disconnecting a PMW when the bridge is a target of the operation. When the bridge is the master of an operation, the bridge may monitor the target accepting a PMW, accepting a split read completion operation (SRC), accepting a RR with split response, accepting a split write request operation (SWR) with split response, retrying a PMW, retrying a RR, retrying a SWR, retrying a SRC, and disconnecting a SRC. In a PCI-X to PCI-X embodiment of the bridge, the bridge may monitor the primary and secondary busses are PCI-X or PCI busses and the events monitored including accepting a PMW, accepting a SRC, accepting a RR with spilt response, accepting a SWR with split response, retrying a PMW, retrying a RR, retrying a SWR, retrying a SRC, disconnecting a PMW, and disconnecting a SRC when the bridge is the target of an operation. When the bridge is a master of the operation, the bridge may monitor the target accepting a PMW, accepting a SRC, accepting a RR with split response, accepting a SWR with split response, accepting a RR with immediate response, accepting a SWR with immediate response, retrying a PMW, retrying a RR, retrying a SWR, retrying a SRC, disconnecting a PMW, and disconnecting a SRC. In either embodiment, the bridge may further include a mode register corresponding to each performance monitor register where the value of the mode register determines the specified activity monitored by the corresponding performance monitor register.

The mode and counter registers are software accessible, such that it is possible to write an application that will setup the I/O performance monitor hardware for counting certain events of interest and for reading the results after a certain period of time or a specified number of events has elapsed. After the software has captured a number of these samples, the software can analyze the data to assist system and chip designers to tune their designs for better performance.

BRIEF DESCRIPTION OF THE DRAWINGS

Other objects and advantages of the invention will become apparent upon reading the following detailed description and upon reference to the accompanying drawings in which:

FIG. 3 is a table illustrating host bridge target operations monitored in one embodiment of the bus bridge of FIG. 2;

FIG. 4 is a table illustrating host bridge master operations monitored in one embodiment of the bus bridge of FIG. 2;

FIG. 5 is a table illustrating PCI-to-PCI bridge target operations monitored in one embodiment of the bus bridge of FIG. 2; and FIG. 6 is a table illustrating PCI-to-PCI bridge master operations monitored in one embodiment of the bus bridge of FIG. 2.

Figure 1:
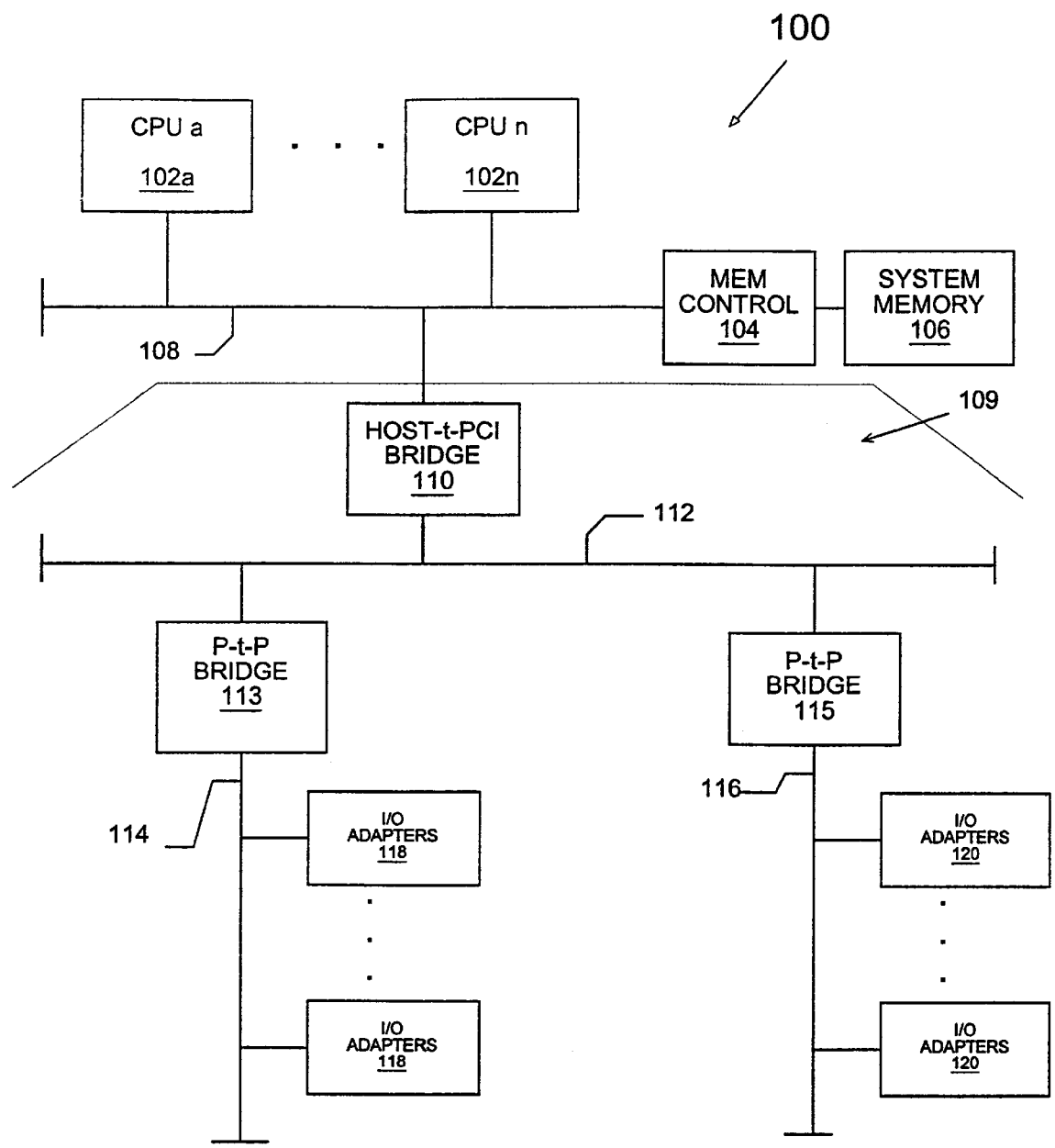
FIG. 1 is a simplified block diagram of a data processing system according to an embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified block diagram representation of a data processing system 100 according to one embodiment of the present invention. The depicted embodiment of data processing system 100 includes one or more central processing units 102a... 102n (generically or collectively referred to herein as processor(s) 102) coupled to a host bus 108. The invention is not limited to a particular implementation of processors 102 and any of a variety of commercially distributed processor architecture families are suitable for use with the invention as contemplated herein. Thus, processors 102 may be PowerPC® processors from IBM Corporation, SPARC® processors from Sun Microsystems, x86 compatible processors available from a number of sources including Pentium® processors from Intel and Athlon® processors from Advanced Micro Devices, or any of a variety of other suitable processors. Each processor 102 has access to a system memory 106 via a memory controller 104 coupled to host bus 108. Although the depicted embodiment indicates memory controller 104 as a discreet unit, it will be appreciated that the function of memory controller 104 may be integrated into each of the processors 102 or integrated into system memory 106. System 100 further includes an I/O subsystem 109 suitable for coupling to host bus 108. I/O subsystem 109 includes a PCI-X host bridge 110, a primary PCI bus 112 and secondary busses and adapters that communicate with host bus 108 via PCI host bridge 110.

For a given PCI bus 112 operating at a given frequency, the number of devices or adapters that can be attached to the bus is limited. To expand the capabilities of computer system 100 beyond more than four slotted devices, PCI-to-PCI (P-t-P) bridges are attached to primary PCI bus 112 to provide one or more secondary busses. In the embodiment depicted in FIG. 1, P-t-P bridge 113 is coupled between primary PCI bus 112 and a first secondary PCI bus 114 while P-t-P bridge 115 is coupled between primary PCI bus 112 and a second secondary PCI bus 116. A first set of I/O adapters 118 is connected to first secondary PCI bus 114 while a second set of I/O adapters 120 is connected to second secondary PCI bus 116.

Figure 2:
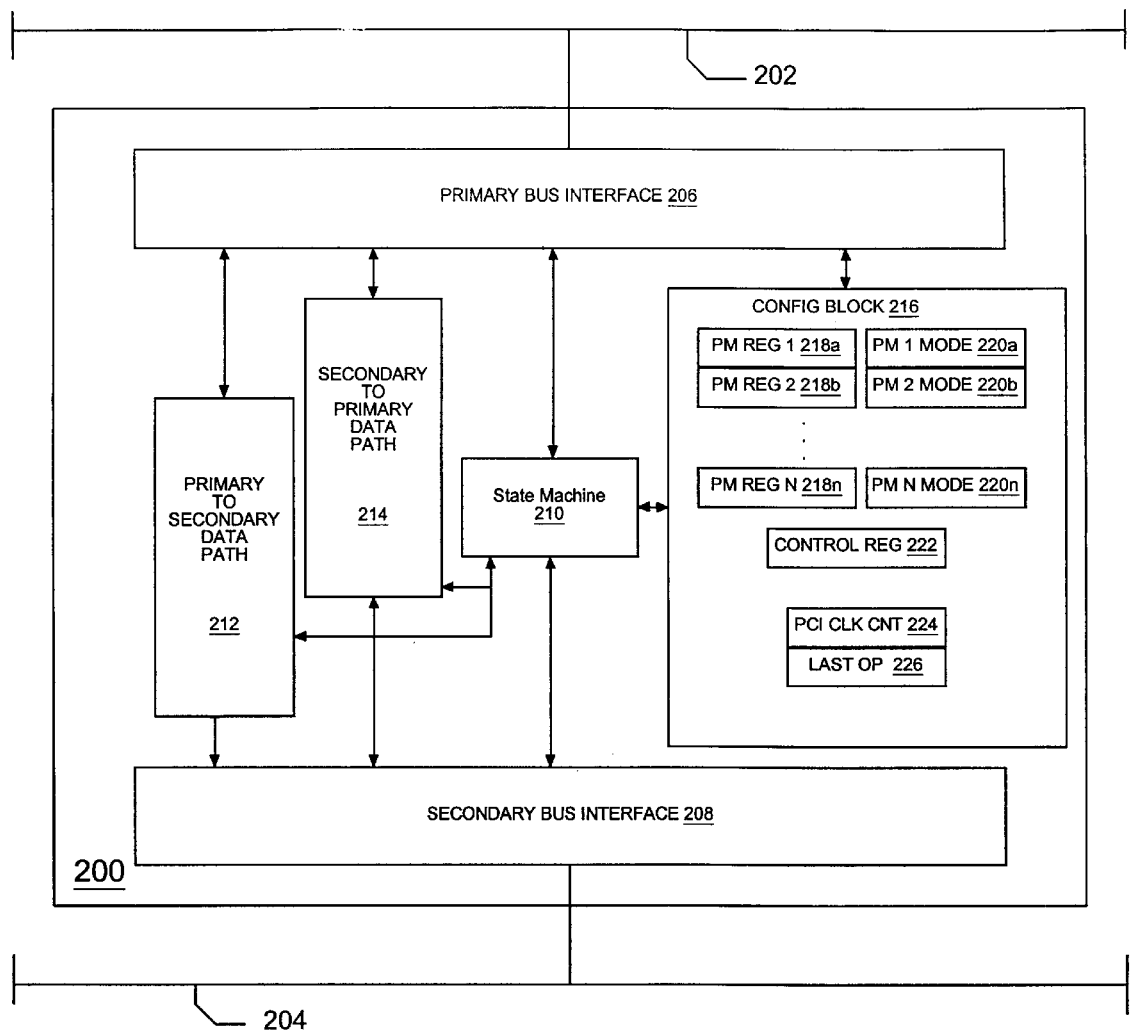
FIG. 2 is a simplified block diagram of a bus bridge according to an embodiment of the invention.

Turning now to FIG. 2, a simplified block diagram of bus bridge 200 according to one embodiment of the present invention is presented. Generally, bus bridge 2000 is able to record occurrences of specified events as a means of monitoring bridge/bus performance within system 100. Thus, the present invention contemplates the implementation of a performance monitor on host bridges such as Host-to-PCI-X bridge 110 of FIG. 1 and intermediate bridges such as PCI-X-to-PCI-X bridges 113 and 115. The invention is suitable for implementation in standard PCI bridges as well as PCI-X bridges. Because the design of PCI-X bridges is typically more complex than the design of conventional PCI bridges, the invention is described herein with respect to PCI-X bridges and PCI-X transactions (also referred to herein as operations).

As depicted in FIG. 2, bridge 200 is suitably connected between a primary bus 202 and a secondary bus 204. Primary bus 202 may be the host bus 108 of system 100 or, for an embodiment in which bridge 200 constitutes a PCIX-to-PCIX bridge, primary bus 202 may be a PCI-X bus. Secondary bus 204 is typically a PCI-X bus. A primary bus interface 206 and a secondary bus interface 208 enable transfer of information between a state machine 210 and primary bus 202 and second bus 204 respectively. Primary bus interface 206 includes a primary target interface for operations in which bridge 200 is the target and a primary bus master interface for operations originated by bus 200. Similarly, secondary bus interface 208 includes a secondary target interface and a secondary master interface. State machine 210 includes logic for controlling the primary and secondary bus interfaces and for maintaining the status and configuration of bridge 200 via a configuration block 216. State machine 210 further controls a primary-to-secondary data path 212 and a secondary-to-primary data path 214. As its name suggests, primary-to-secondary data path 212 provides a path for data received on primary bus interface 206 and driven onto the secondary bus interface 208. Primary to secondary data path 212 is used for write transactions initiated on primary bus 202 and for returning read data for read transactions that were initiated on secondary bus interface 208. Secondary-to-primary data path 214 provides a path for data received from the secondary bus interface 208 and driven onto the primary bus interface 206. Secondary-to-primary data path 208 is used for write transactions initiated on secondary bus 204 and for returning read data for read transactions initiated on primary bus 202. Data paths 212 and 214 both include logic for storing the address of the current transaction and for performing bus command format translations. Data paths 212 and 214 both include a read data queue for storing read data transferred from the target during a read completion and may include additional queues such as delayed transaction queues and posted write data queues.

The configuration block 216 of the depicted embodiment of bridge 200 includes a set of performance monitor registers 218a through 218n (generically or collectively referred to herein as performance monitor register(s) 218). Each performance monitor register 218 provides a mechanism for recording the occurrences of specified events. In one embodiment, state machine 210 is enabled to increment a performance monitor register 218 whenever the specified event is encountered. A performance monitor register 218 could, as an example, count the number of posted memory write operations targeted for a bridge that must be retried. In the depicted embodiment, the number of performance monitor registers 218 is minimized and the flexibility of each performance monitor register 218 is maximized through the use of performance monitor mode registers 220. In the illustrated embodiment, each performance monitor register 218 has a corresponding programmable performance monitor mode register 220. The value stored in each mode register 220 controls the type of event that is recorded or monitored in the corresponding performance monitor register 218. Each performance monitor register 218 is typically a 64-bit register that may be programmed to any value and each performance monitor register 218 may further be programmed to stop when the register overflows. In the depicted embodiment, a control register 222 provides an enable bit corresponding to each performance monitor register 218, where the enable bit is used to start and stop the counting of monitored events.

When an event specified for monitoring by one of the performance mode registers 220 is encountered by bridge 200, the state machine 210 is designed to increment the appropriate register 218 as part of the handling of the specified operation.

Turning now to FIGS. 3 through 6, tables are depicted illustrating the events that may be monitored in preferred embodiments of bridge 200. In each of the tables of FIGS. 3 through 6, each row represents a particular operation and each column represents a particular event. The table indicates combinations of operations and events that are monitored in one embodiment of bridge 200. While other operation/event combinations are capable of being monitored, the combinations indicated in the tables are believed to provide the most meaningful information about bridge/bus performance. In the tables, operation/event combinations that are most desirably monitored are indicated by a YES at the intersection of the row and column corresponding to the operation.

As depicted in FIG. 2, the configuration registers 216 are accessible from primary bus interface 206 via a datapath. The configuration registers 216 are mapped into the address space of bridge 200 such that performance monitor registers 218 and mode registers 220 are accessible from any processor of the system via load and store instructions. Thus, a software tool or application can be written to perform operations such as setting up mode registers 220 to measure certain events and reading performance monitor registers 218 to accumulate data for analysis. This software tool (or a separate tool) can then use the data gathered from performance monitor registers 218 to analyze aspects of the bridge and system design to allow system and chip designers to detect and analyze system bottlenecks.

Referring first to FIG. 3, operation/event combinations preferably monitored are indicated for an embodiment in which bridge 200 is a host bridge for situations in which bridge 200 is the target of an operations. The first row of table 300, for example corresponds to scenarios in which a host bridge is the target of a posted memory write operation. As will be appreciated by those knowledgeable in the field of I/O architectures, this situation occurs when an adapter on a PCI-X bus initiates a direct memory access (DMA) write.

In an embodiment of bridge 200 implemented according to table 300, bridge 200 is capable of monitoring the acceptance of a PMW operation by bridge 200 (as indicated by the YES at the intersection of the first row and first column of table 300). In addition, bridge 200 can monitor whenever a PMW is retried (first row, fourth column) and disconnected (first row, fifth column). The N/A indication in the second and third columns of the first row of table 300 indicate that the corresponding operation/event combination is not possible. Thus, the N/A in the first row, second column of table 300 indicates that a DMA write cannot be accepted with a split response by a host bridge.

The second row of table 300 corresponds to a read request received by a host bridge as will occur during a DMA read initiated by an adapter on a PCI-X bus. For this operation, bridge 200 is preferably enabled to monitor each occurrence of bridge 200 accepting a read request operation with split response (row 2, column 2) and each occurrence of a read request being retried (row 2, column 4). The "N/A" in row 2, column 1 indicates that read request operations indicates the mutual exclusivity of column 1 (simple acceptance) and columns 2 and 3 (acceptance with split response and acceptance with immediate response) in the PCI-X architecture.

The lack of an entry in (row. 2, column 3) and (row 2, column 5) indicates an operation/event combination that is theoretically capable of occurring and being monitored by bridge 200, but which is not monitored in the depicted embodiment of bridge 200. The blank spaces in FIGS. 3–6 typically correspond to operation/event combinations that are either (a) of such infrequent occurrence that they will have little impact on the performance of the I/O subsystem or (b) are effectively capable of being monitored by another event/operation combination. The blank space in (row 4, column 1) of table 300 corresponding to the acceptance of a split read completion (SRC) operation indicates that, although this operation/event combination is capable of being monitored, the combination is effectively monitored by monitoring another operation/event combination. More specifically, since a PCI-X host bridge is not permitted to issue a read request unless the bridge has sufficient buffer space to handle the corresponding split read completion, the operation/event combination is effectively monitored by monitoring the acceptance of read requests issued by the host bridge.

The third row in table 300 (split write request (SWR)) is not applicable because a PCI-X host bridge is prohibited from accepting direct memory access to the I/O or configuration space on the bus. The fourth row of table 300 (split read completion (SRC)) is encountered when, in response to a load operation, an adapter responds to the host bridge that data is ready. Similarly, the fifth row of table 300 (split write completion (SWC)) occurs in response to a store operation to I/O or configuration space.

In summary table 300 indicates that, in an embodiment in which bridge 200 is a host bridge, the target operations that bridge 200 preferably monitors include the acceptance and retrying of posted memory write operations, and the acceptance with split response and retrying of read requests. The remaining operation/event combinations for a host bridge acting as the target of an operation are either not applicable or are capable of being monitored by another operation/event combination.

Referring to FIG. 4, table 400 indicates operation/event combinations preferably monitored by a host bridge acting as the master of specified operations. The first row of table 400 corresponds to a host bridge acting as the master of a PMW operation, which occurs when a processor issues a store operation to memory space on the PCI-X bus. The host bridge relays the store operation by issuing a PMW to memory space. Bridge 200 preferably monitors the occurrences of such operations and the number of PMW's issued by the host bridge that are retried. The disconnected column is not of particular interest in this case because the store operation is most likely four bytes or less and is therefore highly unlikely to be disconnected. Row 2 of table 400 correspond to a host bridge as the master of a read request (RR). This occurs when a processor issues a load operation to address space on the PCI-X bus. As indicated in table 400, the host bridge 200 is preferably enabled to monitor the number of issued RR's that are accepted with split response and the number of issued RR's that must be retried. Row 3 of table 400 corresponds to a SWR that can occur when a processor issues a store operation to I/O or configuration space on the PCI-X bus. Bridge 200 is preferably configured to monitor the acceptance with split response of such operations and number of SWR's issued by host bridge 200 that must be retried. Host bridge 200 issues an SRC, as indicated in row 4 of table 400 when DMA read data requested by an adapter is ready for the requestor. Bridge 200 is preferably designed to monitor the number of such transactions, the number of SRC's that must be retried, and the number of SRC's that are disconnected. Finally, row 5 of table 400 is not applicable since the host bridge does no accept DMA to I/O space.

Turning now to FIG. 5, table 500 indicates the operation/event combinations preferably monitored when bridge 200 is a PCI-X to PCI-X bridge acting as the target of the operations listed in each of the rows. Row 1 of table 500 is applicable when the PCI-X to PCI-X bridge 200 is the target of a PMW operation, which occurs during a DMA write to system memory or during a store operation to memory space if the PMW is on the PCI-X bus that is connected to the host bridge (i.e., the PCI-X to PCI-X bridges primary bus). The preferred embodiment of bridge 200 monitors the acceptance of such operations, the number of retries, and the number of disconnects. Row 2 is applicable for the PCI-X to PCI-X bridge as target of a RR, which corresponds to a DMA read request to system memory or to a load operation (if the RR is on the PCI-X to PCI-X bridge's primary bus). The preferred bridge 200 monitors, the acceptance with split response and the number of retries of such operations. Row 3 of table 500 corresponds to the PCI-X to PCI-X bridge 200 as the target of a SWR. This occurs during a store operation to I/O or configuration space on the PCI bus (if the SWR is on the PCI-X to PCI-X bridge's primary bus). Bridge 200 preferably monitors the occurrence of such events and the number of retries. Row 4 corresponds to the PCI-X to PCI-X bridge 200 acting as the target of an SRC in response to a DMA read to system memory or a response from an adapter to a load operation. Bridge 200 preferably monitors the acceptance of SRC's received and the number of retries that are encountered. Row 5, in which the operation is a SWC occurs when in response to a store operation to I/O or configuration space. The number of such operations accepted can be effectively monitored by counting the number of SWR's the bridge masters. All other columns of row 5 are not applicable.

Turning now to FIG. 6, table 600 indicates a preferred set of operation/event combinations monitored by a PCI-X to PCI-X bridge 200 acting as the master of the corresponding operations. In row 1, corresponding to a bridge 200 as the master of a PMW operation, an I/O adapter has initiated a DMA to system memory or a processor has initiated a stored operation to memory space on the PCI bus. In the preferred embodiment, bridge 200 monitors the PMW's accepted, retried, and disconnected. For row 2, in which bridge 200 masters a RR, an adapter has initiated a DMA read request to system memory or, the processor has initiated a load operation to an adapter. Bridge 200 preferably monitors the number of RR's accepted with split response, the number of RR's accepted with immediate response, and the number of retries. Row 3 corresponds to SWR's wherein the bridge 200 masters an SWR in response to a store operation from the processor to an I/O adapter. Bridge 200 preferably monitors the number of SWR's accepted with split response, the number of operations accepted with immediate response, and the number of retries. In row 4, corresponding to bridge 200 as master of an SRC, load data from an adapter is forwarded to the host bridge or DMA read data from system memory is forwarded to an adapter. Bridge 200 preferably monitors the number of issued SRC's that are accepted, the number of retries, and the number of disconnects. Events in row 5, corresponding to the bridge as master of an SWC, can be effectively monitored by monitoring the master of the corresponding SWR.

In addition to the foregoing mode registers 220 and performance monitor registers 218, one embodiment of bridge 200 includes a dedicated counter 224 configured to count the number of PCI clock cycles on the PCI bus. Bridge 200 may further include a dedicated "last operation" register 226 (for each PCI bus) that can be queried by software and contains the last bus operation, the operation direction (i.e., master/target), and the size of the operation. It should be noted that dedicated registers for these functions are not required, but could instead be provided by a mode that is programmed into a mode register 220 and counted by one of the programmable performance monitor registers 218.

For embodiments in which bridge 200 is a host bridge, it is desirable to determine whether the Translation Control Entry (TCE) cache and caching algorithm are adequate. Thus, a host bus bridge 200 may further include the capability to count the number of TCE hits and misses (fetches) respectively via an appropriate setting of a mode register 220. In addition, it may be desirable to monitor the caching efficiency of a host bridge. A write to a cache line that is cached in the host bridge is referred to as a DKILL. A delayed DKILL occurs when there is a write to a cache line that is cached in the host bridge, but the cache line data has not yet been used by the adapter that requested the data. In this situation, the host bridge may be configured to retain the data in the cache line until the requesting adapter retrieves at least one byte of the data. The number of DKILL's and delayed DKILL's are therefore indicative of the host bridge caching efficiency and the depicted embodiment of bridge 200 includes the capability of monitoring these events via appropriate settings of mode registers 220. Bridge 200 may further include a mode register setting for counting the total amount of data received from the host bus. For a PCI-X to PCI-X embodiment, bridge 200 may further include a mode register settings for monitoring the number of non-PCI idle cycles and for counting the number of data cycles.

Using the various mode registers and performance monitor registers described herein greatly facilitates the analysis of I/O performance in a complex data processing system. As system performance is increasingly limited by the performance of the I/O subsystem, the invention addresses an area of primary concern for systems designers and manufacturers.

It will be apparent to those skilled in the art having the benefit of this disclosure that the present invention contemplates a mechanism for efficiently monitoring I/O subsystems performance. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. In a data processing system, a bus bridge comprising:
   a primary bus interface coupled to a primary bus;
   a secondary bus interface coupled to a secondary bus;
   a performance monitor register; and
   a state machine connected to the primary and secondary bus interfaces and configured to count the occurrences of a specified combination of memory transaction and memory transaction handling event using the performance monitor register, wherein the specified transaction handling event reflects the manner in which the bus bridge handles the corresponding memory transaction.

2. The bridge of claim 1, wherein the primary bus is a host bus of the data processing system and the secondary bus is a bus selected from the group consisting of PCI bus and PCI-X bus.

3. The bridge of claim 2, wherein the specified combination is selected from a first group of combinations if the bus bridge is the target of a memory transaction and from a second group of combinations if the bus bridge is the master of the transaction.

4. The bridge of claim 3, wherein the first group of combinations includes combinations selected from the group consisting of accepting a posted memory write (PMW), accepting with split response a read request (RR), retrying a PMW, retrying a RR, and disconnecting a PMW.

5. The bridge of claim 3, wherein the second group of combinations includes combinations selected from the group consisting of accepting a PMW, accepting a split read completion operation (SRC), accepting a RR with split response, accepting a split write request operation (SWR) with split response, retrying a PMW, retrying a RR, retrying a SWR, retrying a SRC, and disconnecting a SRC.

6. The bridge of claim 1, wherein the primary bus is a bus selected from the group consisting of a first PCI bus and a first PCI-X bus and the secondary bus is a bus selected from the group consisting of a second PCI bus and a second PCI-X bus.

7. The bridge of claim 6, wherein the combination is selected from a third group of combinations if the bus bridge is the target of a transaction and from a fourth group of combinations if the bus bridge is the master of a transaction.

8. The bridge of claim 7, wherein the third group of combinations includes combinations selected from the group consisting of accepting a PMW, accepting a SRC, accepting a RR with spilt response, accepting a SWR with split response, retrying a PMW, retrying a RR, retrying a SWR, retrying a SRC, disconnecting a PMW, and disconnecting a SRC.

9. The bridge of claim 7, wherein the fourth group of combinations includes combinations selected from the group consisting of accepting a PMW, accepting a SRC, accepting a RR with split response, accepting a SWR with split response, accepting a RR with immediate response, accepting a SWR with immediate response, retrying a PMW, retrying a RR, retrying a SWR, retrying a SRC, disconnecting a PMW, and disconnecting a SRC.

10. The bridge of claim 1, further comprising a mode register corresponding to the performance monitor register, wherein the value of the mode register determines the specified combination monitored by the corresponding performance monitor register.

11. The bridge of claim 10, wherein the processor can access the performance monitor and mode registers via load and store instructions.

12. The bridge of claim 10, wherein the state machine is configured to stop counting if a performance monitor register overflows.

13. The bridge of claim 1, further comprising a PCI clock count register configured to monitor the number of PCI clock cycles on the primary or secondary bus.

14. The bridge of claim 1, further comprising a last transaction register that contains the last transaction executed on the primary bus, the direction of the last operation, and the size of the operation.

15. A data processing system, comprising:
   a system memory;
   a processor coupled to the system memory via a host bus;
   a host bus bridge coupled between the host bus and a PCI bus, the host bus bridge comprising a host bus interface coupled to the host bus, a PCI bus interface coupled to a first PCI bus, a performance monitor register, and a state machine connected to the host bus and PCI bus interfaces and configured to count the occurrences of a specified combination of memory transaction and memory transaction handling event using the performance monitor register, wherein the specified transaction handling event reflects the manner in which the bus bridge handled the memory transaction.

16. The system of claim 15, further comprising a mode register corresponding to the performance monitor register, wherein the value of the mode register determines the specified combination monitored by the corresponding performance monitor register.

17. The system of claim 15, wherein the host bus bridge further comprises a PCI clock count register configured to monitor the number of PCI clock cycles on the first PCI bus.

18. The system of claim 15, wherein the host bus bridge further comprises a last transaction register that contains the last transaction executed on the host bus, the direction of the last operation, and the size of the operation.

19. The system of claim 15, further comprising a PCI-X to PCI-X bus bridge connected between the first PCI bus and a second PCI bus, wherein the PCI-X to PCI-X bus includes a performance monitor register capable of monitoring specified combinations occurring on the first or second PCI-X busses.

20. The system of claim 19, wherein the PCI-X to PCI-X bus bridge further comprises a mode register corresponding to the performance monitor register, wherein the setting of the mode register indicates the specified combinations monitored by the performance monitor register.

* * * * *